(12) United States Patent
Snidow

(10) Patent No.: US 9,692,218 B2
(45) Date of Patent: Jun. 27, 2017

(54) MULTI-PURPOSE CONDUIT PLATE

(71) Applicant: Steven B. Snidow, Austin, TX (US)

(72) Inventor: Steven B. Snidow, Austin, TX (US)

(73) Assignee: SCUINT CORPORATION, Austin, TX (US)

( * ) Notice: Subject to any disclaimer, the term of this patent is extended or adjusted under 35 U.S.C. 154(b) by 61 days.

(21) Appl. No.: 13/766,765

(22) Filed: Feb. 13, 2013

(65) Prior Publication Data

US 2014/0224518 A1  Aug. 14, 2014

(51) Int. Cl.
| | | |
|---|---|---|
| *H01R 13/46* | (2006.01) | |
| *H02G 3/18* | (2006.01) | |
| *H02G 3/04* | (2006.01) | |
| *H02G 3/22* | (2006.01) | |

(52) U.S. Cl.
CPC .............. *H02G 3/18* (2013.01); *H02G 3/0418* (2013.01); *H02G 3/22* (2013.01)

(58) Field of Classification Search
CPC ...... H02G 15/076; H02G 3/16; H02G 15/117; H02G 3/185; H02G 9/10; H02G 3/00; H02G 15/04; H02G 3/18; H02G 3/22; H02G 3/0418; H04Q 1/141; H02B 5/02; H01R 13/74; H01R 13/72; H01R 25/006; H01R 27/02; H01R 43/26; A62C 2/065; E04B 1/947; E04D 3/366; F24J 2/045; H02S 20/23; H05K 7/02; Y02B 10/12; Y02E 10/47; Y02E 10/44; Y10S 136/291; Y10T 29/49208

USPC ......... 29/876; 52/220.8, 509, 512; 136/251, 136/244, 291; 174/50, 60, 483, 485, 487; 439/501, 574
See application file for complete search history.

(56) References Cited

U.S. PATENT DOCUMENTS

| | | | | |
|---|---|---|---|---|
| 4,189,881 A | * | 2/1980 | Hawley | E04D 3/366 |
| | | | | 136/244 |
| 4,530,273 A | | 7/1985 | Smith | |
| 4,965,971 A | | 10/1990 | Jean-Jacques et al. | |
| 5,705,772 A | * | 1/1998 | Brown | H02G 3/185 |
| | | | | 174/487 |
| 6,276,962 B1 | * | 8/2001 | Gaines | H02G 3/14 |
| | | | | 174/66 |
| 7,551,456 B2 | | 6/2009 | Behrens et al. | |
| 7,743,495 B2 | | 6/2010 | Mori et al. | |
| 8,028,477 B2 | | 10/2011 | Crookston | |
| 2003/0168231 A1 | * | 9/2003 | Stout | H02G 3/185 |
| | | | | 174/483 |
| 2007/0275594 A1 | * | 11/2007 | Greenberg | H01R 13/72 |
| | | | | 439/501 |
| 2009/0057119 A1 | * | 3/2009 | Burkett | 200/332.1 |
| 2014/0030910 A1 | * | 1/2014 | Carpanzano | H01R 13/74 |
| | | | | 439/501 |

OTHER PUBLICATIONS

Wayback Machine for PDC-SP3500SC (ALX-TNP528) from CableOrganizer.*

* cited by examiner

*Primary Examiner* — Timothy Thompson
*Assistant Examiner* — Guillermo Egoavil

(57) ABSTRACT

A connecting plate to an electrical, or other, conduit and that may act as an end cap to the conduit, as a means of electrical and electronic interconnection through the conduit, as a tamper-resistant end cap lock and combinations thereof.

1 Claim, 8 Drawing Sheets

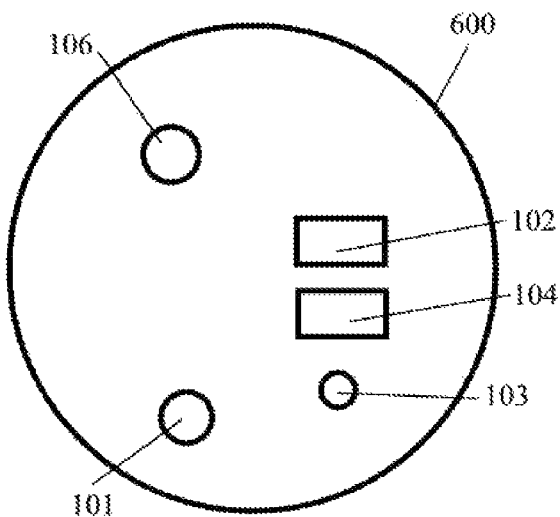
FIG. 5A
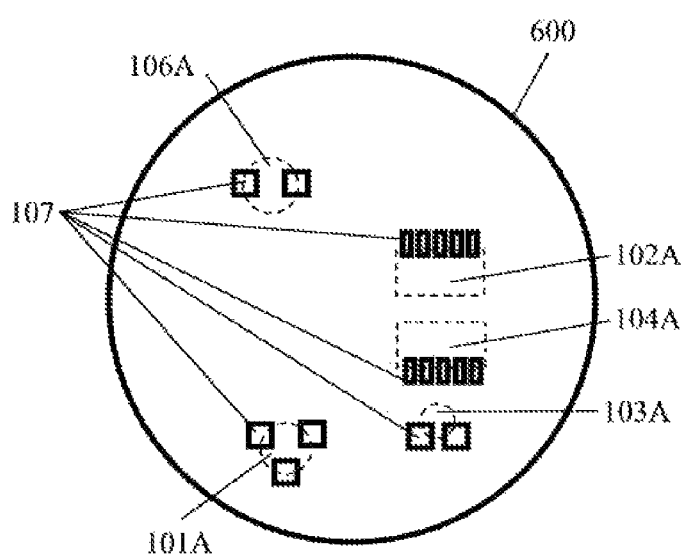
FIG. 5B
FIG. 5

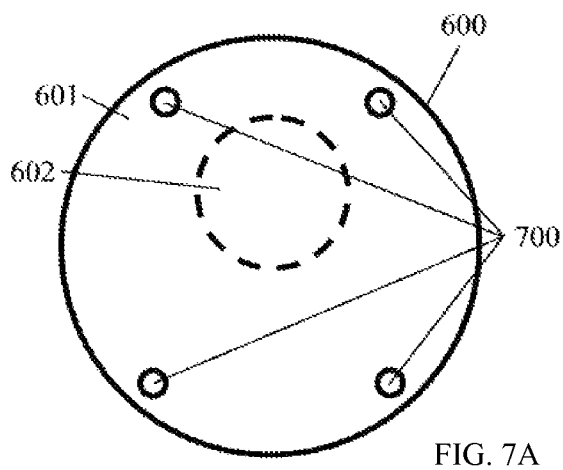
FIG. 7A
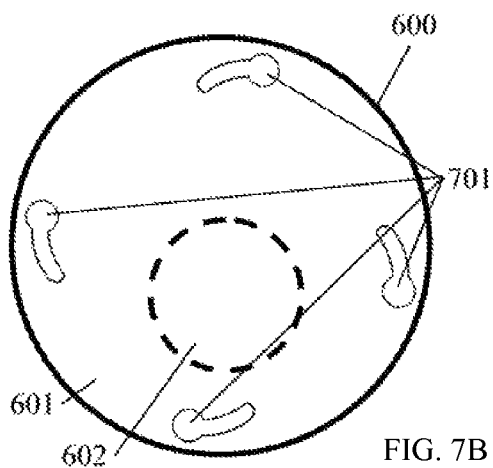
FIG. 7B
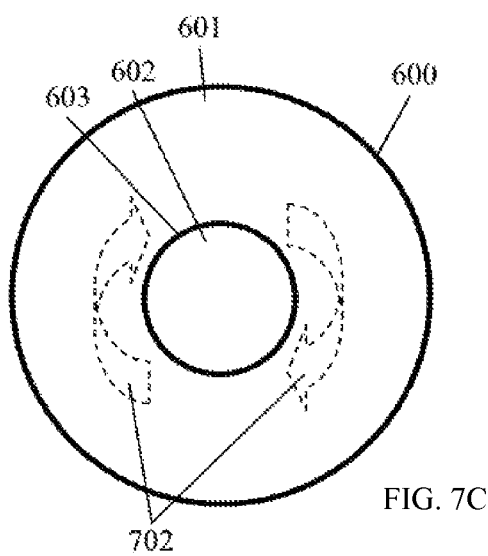
FIG. 7C
FIG. 7

MULTI-PURPOSE CONDUIT PLATE

CROSS-REFERENCE TO RELATED APPLICATIONS

This application claims the benefits of the filing of U.S. Provisional Patent Application Ser. No. 61/598,330 entitled, Multi-Purpose Conduit Plate, filed Feb. 13, 2012 and the specification thereof is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

TECHNICAL FIELD

The present invention is in the technical field of electrical and electronic devices. More particularly, the present invention is in the technical field of wired and wireless interconnection of multi-part electrical and electronic devices as applied to dual-purpose, or multi-purpose, physical connections of devices.

BACKGROUND OF THE INVENTION

Conventional design of many consumer-level electronic devices is to be manufactured as a standalone unit and consisting, often, of one, or more, printed circuit boards with various components attached and all encased in a shell that is typically a rigid plastic form. Most electronic devices also have some embedded software and methods of attachment for input and output signals such as cable connections, monitor connections, electrical connections, etc. Such consumer-level electronic devices are commonly used in households and in businesses and are typically powered from an existing wired service such as AC power outlets wired by an electrician for such purposes. Certain consumer-level electronic devices are further connected to wired solutions within a house or building such as those requiring a coaxial cable or telephone connection. In some cases, such consumer-level electronic devices that are wired act as a wireless connection, or hub, for other devices. A wireless router is an example of such wireless hub.

In many instances, such as a home office, there are a great number of wires, cable, cords and other "lines" such as to create a great deal of congestion if not also a safety hazard. Typical approaches to reduce the congestion, and hazards, have been to use various devices to bundle the 'lines' together and, or, affix them to a wall, or floor, in order to better control the numerous 'lines.' Solutions to this issue have been many and may include use of zip ties for bundling cords together to the concepts of a wireless computer mouse that negates the use of a connected cord. Most solutions address congestion of cords as the symptom of the issue as opposed to the root cause of the issue and that is home design integrating technology devices. More specifically, the various, and numerous, consumer-level electrical and electronic devices are designed to be attached within a room, built as livable space, and attached to the wired outlets (both electrical or communications). There are not approaches to make such connection at the source of the power, or communication line, where it enters the house. Prior inventions, shown below, address the first issue of organization and hazard removal or the second issue of creating a device connected to a conduit that may penetrate an exterior, or interior, wall, roof or floor and wherein such device serves as a connector to such conduit and may serve additional purposes to that of connection.

U.S. Pat. No. 7,743,495 (Mori et al; Jun. 29, 2010) teaches us of an approach to power cord management in which multiple power cords can be connected to a single device comprised of a number of outlets and in such a way as to effect a better organization of such cords in a housing. The power strip device is then, itself, connected to a conventional AC outlet. The utility of this patent shows one approach for cord management.

U.S. Pat. No. 4,965,971 (Jean-Jacques et al; Oct. 30, 1990) teaches us of an innovative approach of placing a conduit through a roof in which two shapes that are each comprised of a short hollow pipe formed to a hollow half-circle shape that are connected together at the half-circle shape and through a hole in a metal plate and in such a way that the metal plate includes pivot pins allowing for the now attached two halves to tilt on the pivot formed. From this basic structure, smaller diameter pipes can be inserted into the conduit ends of the device and for other purposes. The utility of this invention is mainly provided in it unique approach to providing field-ready adjustments for pipe installation. The invention, as described, is used solely for the principle of extending, or continuing, a running length of pipe (conduit).

U.S. Pat. No. 4,530,273 (Smith; Jul. 23, 1985) teaches us of a roof ventilator wherein such ventilator is comprised of a conduit vertically penetrated through a roof deck and formed in a basic "T" shape such that each arm of the "T" (left and right) are also conduit connected to the single vertical conduit. Attached to the conduit structure, and on the interior side of the roof deck, is a tray that acts to catch condensation from the conduit. The utility of this patent is most directly its design to prevent condensation from dripping onto the broader interior of the house or attic. This patent also helps to establish the concept of a exterior-to-interior, or even interior-to-interior, connection through a roof, or wall, and wherein the purpose of the device is altered from one side of the structure to another such as a vent pipe on one side and a condensate catcher on the other side.

U.S. Pat. No. 8,028,477 (Crookston; Oct. 4, 2011) teaches us about the use of a roof truss plate utilized as a gusset at the apex of the truss and to which a vertical arm can be attached and in which the vertical arm is used as a device to secure a safety wire to which workers can further attach their safety harnesses. The utility of this patent provides for the safety of people but also extends the principle that the purpose of the device on one side of the roof decking is different from the purpose of the device on the other side of the roof decking. This invention further introduces the concept of such a device to have structural integrity in that it can bear the weight of workers that have, presumably, fallen.

U.S. Pat. No. 7,551,456 (Behrens et al; Jun. 23, 2009) teaches us of a rack architecture and management system in which a number of electronic devices are housed within a common cabinet and placed on racks and wherein such racks are stacked vertically with the effect analogous to having several personal computers contained within the one cabinet and increasing the amount of electronic service per square foot. More specifically to this invention, a vertical column within the larger cabinet is utilized in order to house and arrange a number of interface modules (electronic interconnects). This patent includes many other elements but the utility shown for electrically interconnection is already demonstrated and that is this patent shows the principle of using a single device, a vertical column, to house a number of interconnections.

SUMMARY OF THE INVENTION

The present invention is a plate, or cover, to a conduit and that is partially comprised of electrical and electronic interconnects such that the functions of the electronic devices can be manifested at the point of connection to a conduit housing any of power, coaxial, telephone, fiber optic, or other, lines and such that the plate, or cover, may additionally act as a method of structural support to conduit and, or, as a tamper-resistant lock.

The primary objective of the present invention is to provide additional and versatile means of electrical and/or electronic interconnection, including wireless means of data transmission, at the terminal end(s) of a conduit used to house one, or more, electrical and/or electronic wires, cables and/or small devices.

The primary advantage of the present invention is to provide a safe means to enclose exposed wires and cables within the confines of a closed, with end cap, conduit and for that end cap, or cover plate, to provide for the plug-and-play interconnection of such wires and cables within the conduit to the exterior of the conduit so as to help assure a safer end solution while also providing for multiple means of interconnection that provide for faster means of interconnection and/or installation.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

FIG. 5 is comprised if FIG. 5A that shows the back view of present invention depicting one type of electrical and electronic connection and FIG. 5B that shows the back view of the present invention depicting a second type of electrical and electronic connection;

FIG. 7 is comprised of FIG. 7A, FIG. 7B and FIG. 7C. FIG. 7A is the back view of the present invention showing a method of physical connection. FIG. 7B is the back view of the present invention showing an alternative method of physical connection and FIG. 7C is the back view of the present invention showing a third, and alternative, method of physical connection.

DETAILED DESCRIPTION OF THE INVENTION

Figure 1:
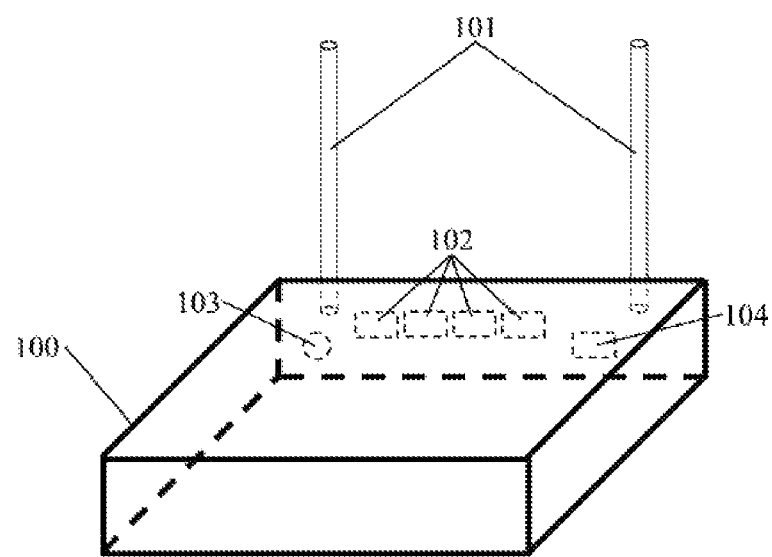
FIG. 1 is a perspective and transparent view of a typical electronics device.

Referring to FIG. 1, a typical consumer-level electronic device 100 is shown and is meant to represent any number of electronic devices and appliances that require power and may allow for additional connections for input and output. The generic device shown in FIG. 1 is modeled after a wireless router with antenna 101, output connections 102, power connection 103 and input connection 104. It should be understood that device 100 is a generic device and connections 102, 103 and 104 may be configured of different connections such as USB slots, plugs, serial connectors, parallel connectors or other. Additionally, it should be understood that any device with an antenna 101 may be comprised of an embedded, or hidden, antenna not depicted here.

Figure 2:
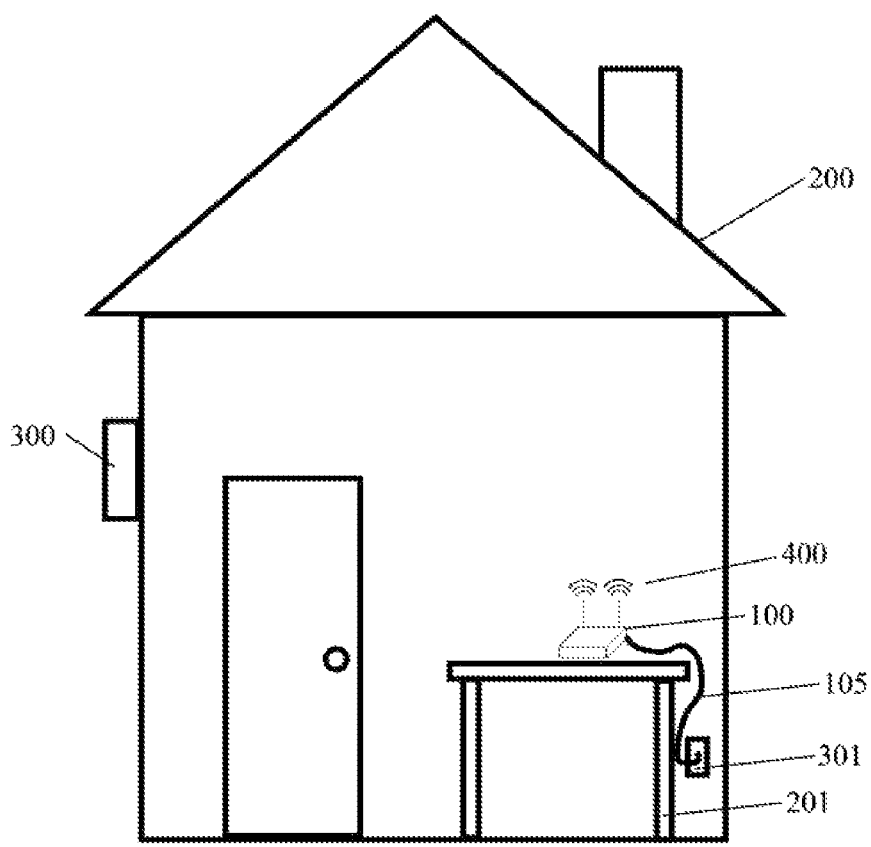
FIG. 2 is a simplified view of a typical house with normal placement of typical electronic device shown in FIG. 1.

Now referring to FIG. 2, a typical house 200 is shown in simplified form to demonstrate the typical placement of consumer-level electronic device 100 such as on a table 201. Typical house 200 is shown with an exterior box 300 and that is understood to represent any of electrical meter box, electrical junction box, coaxial cable box or other, similar, encasement. Consumer-level electronic device 100 is shown to be connected to AC power outlet 301 by power cord 105. Device 100 is further shown as a wireless-enabled device with radio signals 400.

Figure 3:
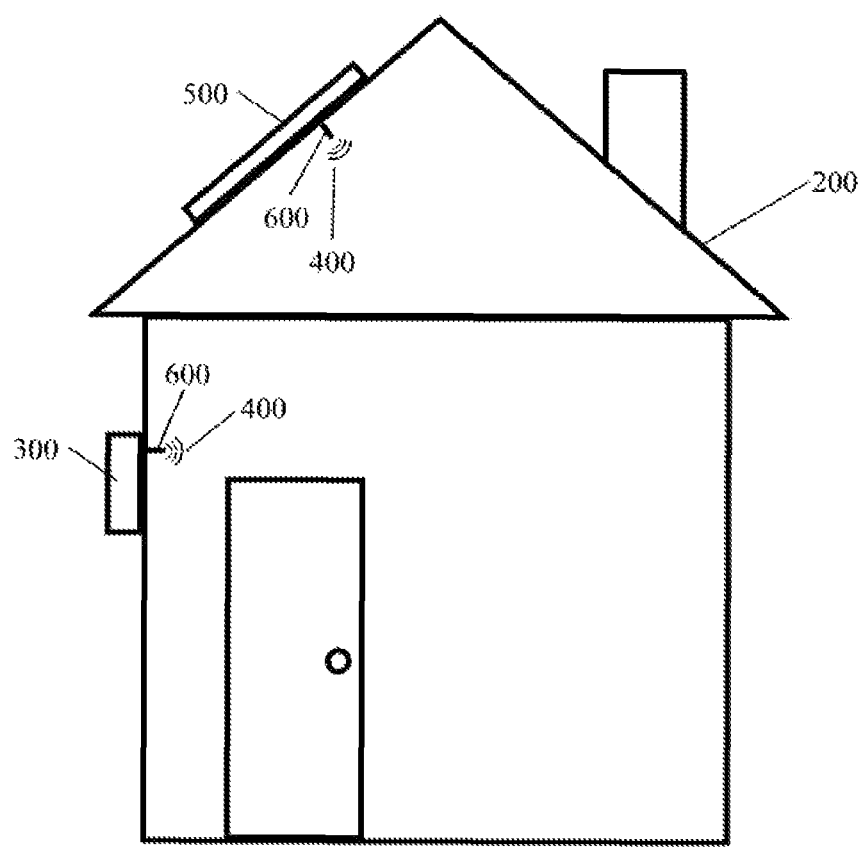
FIG. 3 is a simplified view of a typical house with alternative placement of electronic device shown in FIG.4 as the present invention.

Now referring to FIG. 3, a typical house 200 is shown in simplified form to demonstrate the alternative placement of an electronic device and that will represent the present invention 600. Typical house 200 is shown both with exterior electrical, or electronic, box 300 and solar panel, or related, device 500. Present invention 600, shown in simplified form only, is placed adjacent, and alternatively, to box 300 and, or, solar device 500 and for the purpose of being interconnected to box 300 and, or, solar device 500 via a conduit through the wall or roof as appropriate. Present invention 600 is shown as a wireless-enabled device with radio signals 400.

Figure 4:
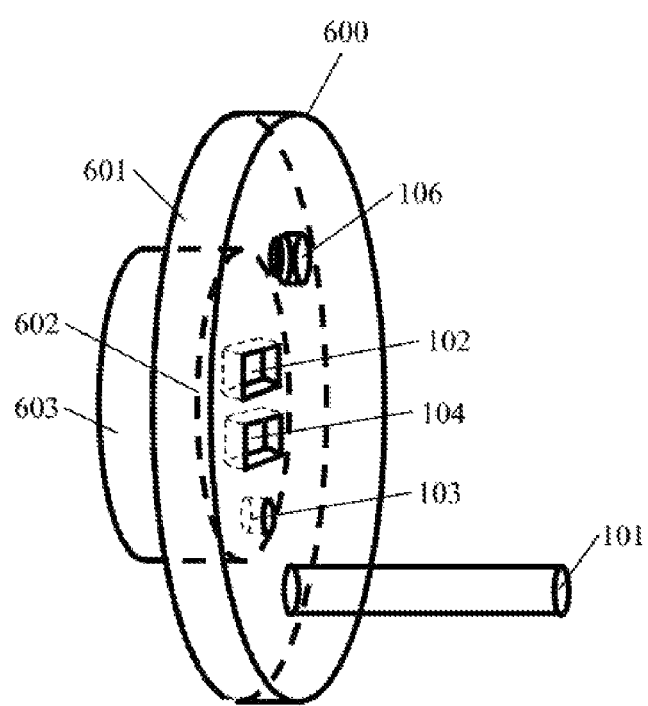
FIG. 4 is a perspective and transparent view of the present invention.

Now referring to FIG. 4, present invention, now referred to as multi-purpose conduit plate 600, is shown in greater detail and in a transparent perspective view. Multi-purpose conduit plate 600 is shown, in this embodiment, to be comprised of antenna 101, output connection 102, power connection 103, input connection 104, input/output connection 106, plate 601 and opening 602 shown with a flange 603. It should be understood that electrical and electronic connections represented as connections 101,102, 103, 104 and 106 may be constructed to different specifications including, but not necessarily limited to, USB, serial, parallel, prong, or other forms of interconnection. It should further be understood that connections 101-106 are interconnected through plate 601 so as to make them accessible to the backside of plate 601 and may, alternatively, be interconnected to each other.

Now referring to FIG. 5, more specifically, to FIG. 5A, the backside of plate 601 is shown and with connections for antenna 101, output connection 102, power connection 103, input connection 104, input/output connection 106 and shown as a mirror image to the placement of those connections on the front side of plate 601 and is meant to illustrate either the pairing of identical connections on opposite sides of plate 601 such that each paired connection is wired to its twin on the other side. Alternatively, the arrangement can represent, for some connections, a pass-through connection in which the represented connection is effectively a hole cut through plate 601 and wired to interconnect at the edges of the interconnect. The connections on the backside of plate 601 are intended to be connected to lines, wires, cables, etc. placed in conduit and terminating into multi-purpose conduit plate 600 and with typical connecting ends as necessary for the type of cord, cable or line (e.g., RJ11 phone jack).

Now referring to FIG. 5B, the backside of plate 601 is shown and with connections for antenna 101, output connection 102, power connection 103, input connection 104, input/output connection 106 and shown as a mirror image to the placement of those connections on the front side of plate 601 and shown as 101A, 102A, 103A, 104A and 106A. This figure is meant to illustrate an alternative approach to wiring the front side connections by use of electrical connections 107 and where it should be understood that electrical connections 107 are any typical electrical connection such as screws, clamps, pins or other means of securing a conductive element to the connections for antenna 101, output connection 102, power connection 103, input connection 104, input/output connection 106. The connections on the backside of plate 601 are intended to be connected to lines, wires, cables, etc. placed in conduit and terminating into device 600 and without typical connecting ends but only exposed conductive elements (e.g., copper wire).

Figure 6:
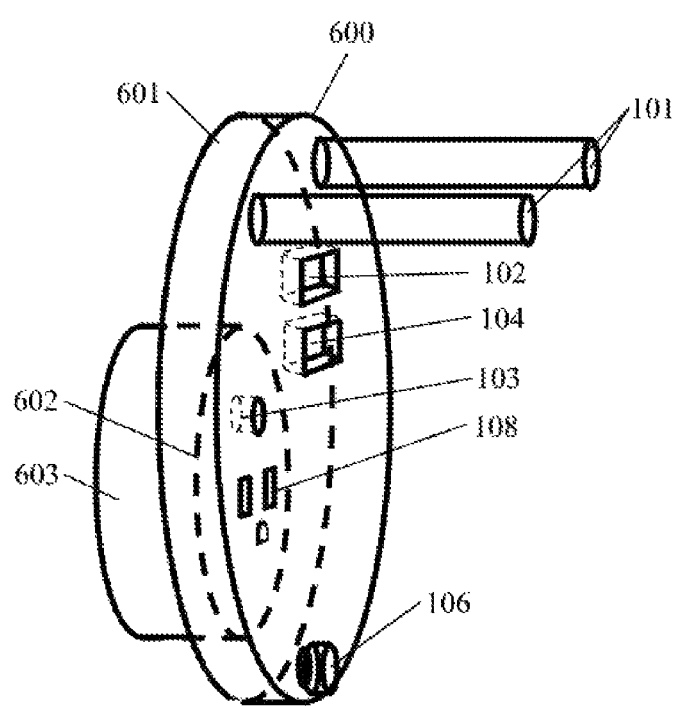
FIG. 6 is a perspective and transparent view of the present invention with alternative embodiment.

Now referring to FIG. 6, multi-purpose conduit plate 600 is again shown in transparent and perspective view but with alternative embodiment. Multi-purpose conduit plate 600 is shown now to be comprised of plate 601, opening 602, flange 603, two antennas 101, output connection 102, power connection 103, input connection 104, input/output connection 106 and conventional AC power socket 108. It should be understood from this figure that multi-purpose conduit plate 600 can be configured to meet different needs and with the placement and count of connections determined by those end needs and in a manner that multi-purpose conduit plate 600 may be comprised of one, or more, of the types of connections represented and wherein any one type of connection may be included multiple times.

Now referring to FIG. 7, more specifically, to FIG. 7A the back of multi-purpose conduit plate 600 is shown with plate 601 and opening 602 for reference. Plate 601 is shown with a plurality of holes 700 and that are meant to represent one method to secure the whole device to another device or substrate such as a wall or ceiling. As represented in FIG. 7A, holes 700 reflect pre-drilled holes through which to insert screws, or bolts, for the purpose of securing the device and that may be understood to be tamper-resistant to lock the multi-purpose conduit plate 600 into position.

Now referring to FIG. 7B the back of multi-purpose conduit plate 600 is shown with plate 601 and opening 602 for reference. Plate 601 is shown with a plurality of notches 701 whose purpose is to secure the whole device to another device or substrate such as a wall or ceiling and in such manner that other device, or substrate, has a matching set of posts configured with an enlarged end and such that the enlarged end can be inserted through the widest part of the notch and the hold, through tension, the whole device when whole device is turned such that the enlarged post end is placed in the narrow portion of the slot and thus creating tension to hold the device in place.

Now referring to FIG. 7C the back of multi-purpose conduit plate 600 is shown with plate 601, opening 602 and flange 603. Curved arrows 702 are meant to represent threading on either the interior, or exterior, of flange 603 and such that the whole device may be secured to another device or substrate such as a wall or ceiling fitted with a threaded element and where flange 603 may be the male threaded element or the female threaded element.

Figure 8:
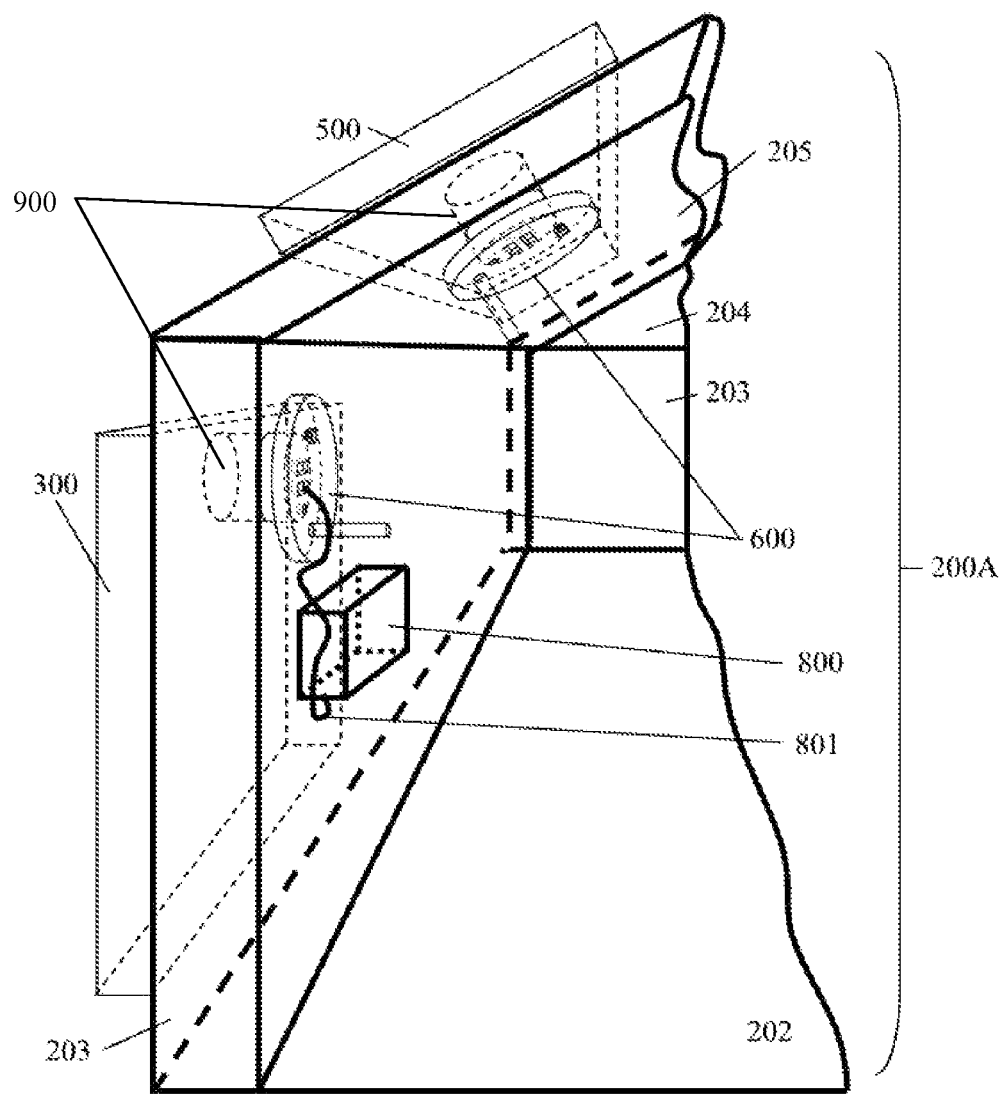
FIG. 8 is a non-scaled perspective view of a typical room interior with alternative placement of present invention to other devices.

Now referring to FIG. 8, portion of a house 200A is shown in perspective view with housing elements to include a floor 202, walls 203, gable wall 204 and roof 205. House portion 200A and all elements are simplified and not drawn to scale to one another and not to the other elements described herein for FIG. 8. FIG. 8 is meant to represent the placement of multi-purpose conduit plate 600 in two embodiments and noting that alternative embodiments not shown are also possible. In FIG. 8 multi-purpose conduit plate 600 is shown connected through the roof 205 to solar device 500 through conduit 900. Alternatively, multi-purpose conduit plate 600 is shown connected through wall 203 and to exterior box 300 through conduit 900 and where box 300 may represent an electric meter, junction box, coaxial cable box, telephone box or similar. In this second embodiment, multi-purpose conduit plate 600 is further connected to box 800 by cable 801 and wherein cable 801 should be understood to represent any cable, cord, wire, optic line, or other similar, line that is appropriate to make connection between 600 and 800. It should further be understood that box 800 may represent one, or more, various different electrical and, or, electronic devices and such that the principle of using multi-purpose conduit plate 600 as a means of directly connecting, controlling and routing sources of power and data transmission to nearby devices is better understood.

The advantages of the present invention include, without limitation, the ability to provide for new means of interconnecting electronic and/or electrical wires and/or devices contained within a conduit to other devices exterior to the conduit and/or to enable the wireless communication from devices held within the conduit or attached to the conduit to other wireless devices exterior to the conduit. Such ability will enable the combination of electrical and electronic devices to be more effectively co-located to the benefit of design and end user functionality.

In broad embodiment, the present invention is a conduit cover that provides for the same functionality of traditional conduit covers or end cap such as serving as a means of protective enclosure but with the additional utility of also serving as a means to electrically, electronically and/or wirelessly interconnect to wiring or electrical and/or electronic devices contained within the conduit while also acting as a lockable end cap to help reduce tampering of contents held within the conduit.

Description of the Preferred Embodiments (Best Modes for Carrying out the Invention)

The present invention may be used as a means to cap or close an open conduit, pipe or similar device with the additional benefit of interconnecting wires, cable and/or devices held within the conduit to interconnection devices held on the surface of the body of the present invention thus allowing for wired, or wireless, interconnection from the end of the conduit to any devices located to the exterior of the conduit and where any wires, cables, etc. held within the body of the conduit are interconnected to another electrical and/or electronic device located within the conduit or at the opposite end of the conduit and effecting a means of electrical and/or electronic interconnection from one end of the conduit to the other such as to penetrate walls, roofs, floors or other structures.

As a preferred embodiment, the present invention is an end cover plate to a conduit that houses multiple electrical and/or electronic wires, cables and/or small devices and where the present invention is comprised of a rigid form that encases multiple forms of interconnection from the interior of the cover plate to the exterior of the cover plate and such that the exterior cover plate interconnections are defined interconnection designs such as USB, RCA, coaxial, antenna or other interconnection methods, that provide for a conduit end cap to become a functional electrical and/or electronic device.

The present invention may be utilized as a substitute to and improvement over conduit end caps without any means of electrical and/or electronic interconnect and, conversely, over other means controlling the routing of wires and cables through a conduit without a terminal end cap and especially when different wires and cable are intended to interconnect to through different interconnection devices.

INDUSTRIAL APPLICABILITY

The invention is further illustrated by the following non-limiting examples.

EXAMPLE 1

The present invention may act as a conduit cover plate, or end cap, that is electrically interconnected to an energized wire held within the conduit and such that when the end cap is mounted to the conduit, the exterior-to-the-conduit side of the end cap provides for a standard three-pronged electrical plug interconnection allowing an end user to use the conduit directly as a means to power an electrical device such as a task lamp. Additional to the electrical interconnect, the conduit also houses a data wire that is interconnected to a USB second interconnect held within the end cap and such that the same end of the conduit may now also act as a means of data transfer from one device at the opposite end of the conduit, such as a computer in another room, to the end user and such that the end user may use the one end cap of the one end of the conduit for electrical and electronic interconnection.

EXAMPLE 2

The present invention may act as an end cap to the electrical conduit used for a solar panel and where conduit is used not only for the placement of electrical wires from the solar panel(s) to a load but also as a structural member to secure the solar panel(s) onto a structure. In such case, the end cap may be further used to provide for the electrical interconnection of solar panel(s) to a load, for the electronic interconnection of microinverters to a computing device and may further act as a lock to secure the end cap to the conduit to promote safety and reduce tampering of the whole solar panel installation. More specifically, the lockable end cap, the multi-purpose conduit plate, is used on multiple individual conduits and where each conduit houses at least one electrical wire and may also include at least one electronic wire and where any such wires are connected to the inside of the end cap and where the exterior of the end cap contains the plug-and-play connection, such as a typical three-prong electrical socket and a USB socket, for further electrical and electronic interconnection to a load and to a computing device.

EXAMPLE 3

The present invention may act as an end cap to the electrical conduit used for a solar panel and where conduit is used not only for the placement of electrical wires from the solar panel(s) to a load but also as a structural member to secure the solar panel(s) onto a structure. In such case, the end cap may be further used to provide for the electrical interconnection of solar panel(s) to a load, for the electronic interconnection of microinverters to a wireless transmitter that transmit data to a computing device and further acts as a lock to secure the end cap to the conduit to promote safety and reduce tampering of the whole solar panel installation. More specifically, the lockable end cap, the multi-purpose conduit plate, is used on multiple individual conduits and where each conduit houses at least one electrical wire and may also include at least one electronic wire and where any such wires are connected to the inside of the end cap and where the exterior of the end cap contains the plug-and-play connection, such as a typical three-prong electrical socket and a wireless antenna, for further electrical and electronic interconnection to a load and to a wireless receiver, or transceiver, that is further connected to a computing device.

The preceding examples can be repeated with similar success by substituting the generically or specifically described parameters and/or operating conditions of this invention for those used in the preceding examples.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:
1. A multi-purpose conduit plate comprised of at least two sides constructed from at least one rigid material through which two, or more, different USB port, serial pin, parallel pin, coaxial, AC, DC, RCA, power cord, headphone jack, wireless antenna, infrared port or fiber optic connection are provided on the exterior-to-the-conduit side of the multi-purpose conduit plate and that interconnect to the interior-to-the-conduit side of the multi-purpose conduit plate providing for further interconnection to wiring and where the multi-purpose conduit plate is connected directly to a photovoltaic-electrical conduit through any means of compression fitting, screws, bolts and nuts, tension slots, adhesives, snap-on components, clamps, male/female threading.

* * * * *